(12) United States Patent
Chiu, Jr. et al.

(10) Patent No.: US 8,973,795 B2
(45) Date of Patent: Mar. 10, 2015

(54) MULTIFUNCTIONAL STRAP SYSTEM FOR HANDHELD PORTABLE ELECTRONIC DEVICES

(76) Inventors: Herbert Chiu, Jr., Encinitas, CA (US); Wilfred Medel, Aliso Viejo, CA (US)

( * ) Notice: Subject to any disclaimer, the term of this patent is extended or adjusted under 35 U.S.C. 154(b) by 326 days.

(21) Appl. No.: 13/298,198

(22) Filed: Nov. 16, 2011

(65) Prior Publication Data

US 2013/0009413 A1   Jan. 10, 2013

Related U.S. Application Data

(60) Provisional application No. 61/505,943, filed on Jul. 8, 2011.

(51) Int. Cl.

| | | |
|---|---|---|
| *A45F 5/00* | (2006.01) | |
| *F16M 13/00* | (2006.01) | |
| *A45F 5/02* | (2006.01) | |
| *A45C 11/00* | (2006.01) | |
| *A45C 13/30* | (2006.01) | |
| *F16M 11/04* | (2006.01) | |
| *F16M 11/10* | (2006.01) | |
| *F16M 13/02* | (2006.01) | |
| *F16M 13/04* | (2006.01) | |

(52) U.S. Cl.
CPC ............... *F16M 13/00* (2013.01); *A45F 5/021* (2013.01); *A45C 11/00* (2013.01); *A45C 13/30* (2013.01); *F16M 11/04* (2013.01); *F16M 11/105* (2013.01); *F16M 13/022* (2013.01); *F16M 13/04* (2013.01); *A45C 2011/002* (2013.01); *A45C 2200/15* (2013.01); *A45F 2005/006* (2013.01); *A45F 2005/008* (2013.01); *A45F 2200/0516* (2013.01); *Y10S 224/93* (2013.01)
USPC ............ 224/218; 224/250; 224/255; 224/930

(58) Field of Classification Search
CPC ............... A45F 5/00; A45F 2005/008; A45F 2005/1013; A45F 2005/006; A45F 2200/0508; A45F 2200/0516; A45F 2200/0525; A45F 2200/0533; H04B 1/3888; H04M 1/04
USPC ......... 224/217–219, 221, 930, 675, 250, 254, 224/255; 361/679.56, 679.3; 455/575.6
See application file for complete search history.

(56) References Cited

U.S. PATENT DOCUMENTS

| | | |
|---|---|---|
| 5,996,790 A | 12/1999 | Yamada et al. |
| 6,266,685 B1 | 7/2001 | Danielson et al. |
| 6,724,618 B1 | 4/2004 | Jenkins et al. |
| 7,023,692 B2 * | 4/2006 | Mansutti et al. ......... 361/679.56 |
| 7,050,841 B1 * | 5/2006 | Onda ......................... 455/575.8 |
| 7,780,047 B2 * | 8/2010 | Chen et al. ..................... 224/218 |
| 8,561,862 B2 * | 10/2013 | Foggiato ...................... 224/217 |
| 8,567,832 B2 * | 10/2013 | Kannaka ......................... 294/25 |
| 8,622,447 B1 * | 1/2014 | Wirtz .............................. 294/25 |

(Continued)

*Primary Examiner* — Brian D Nash
*Assistant Examiner* — Corey Skurdal
(74) *Attorney, Agent, or Firm* — George P. White

(57) ABSTRACT

A multifunctional strap system for portable electronic devices having a case and a strap on the back of the case. The case securely holds a protective electronic device while allowing access to all necessary features of the device. The strap securely couples a user's hand or other personal effects to the device. The strap may also be attached to a clip that removably attaches the strap to the bottom of the device. The detachable clip of the strap allows the strap system to loop around and be secured onto an object. The case may have an insert that can be used as a kickstand or a protective cover of a card held into place by the strap.

7 Claims, 8 Drawing Sheets

(56) References Cited

U.S. PATENT DOCUMENTS

| | | | |
|---|---|---|---|
| 2002/0099894 A1 | 7/2002 | Kehoe et al. | |
| 2004/0013279 A1* | 1/2004 | Takeda | 381/312 |
| 2006/0054704 A1* | 3/2006 | Fitch et al. | 235/472.01 |
| 2006/0279924 A1 | 12/2006 | Richardson et al. | |
| 2009/0009945 A1* | 1/2009 | Johnson et al. | 361/681 |
| 2009/0120980 A1 | 5/2009 | Calayo | |
| 2010/0116387 A1 | 5/2010 | Channey et al. | |
| 2012/0043234 A1* | 2/2012 | Westrup | 206/320 |
| 2012/0063066 A1* | 3/2012 | Floit | 361/679.01 |
| 2012/0104059 A1* | 5/2012 | Yen | 224/218 |

* cited by examiner

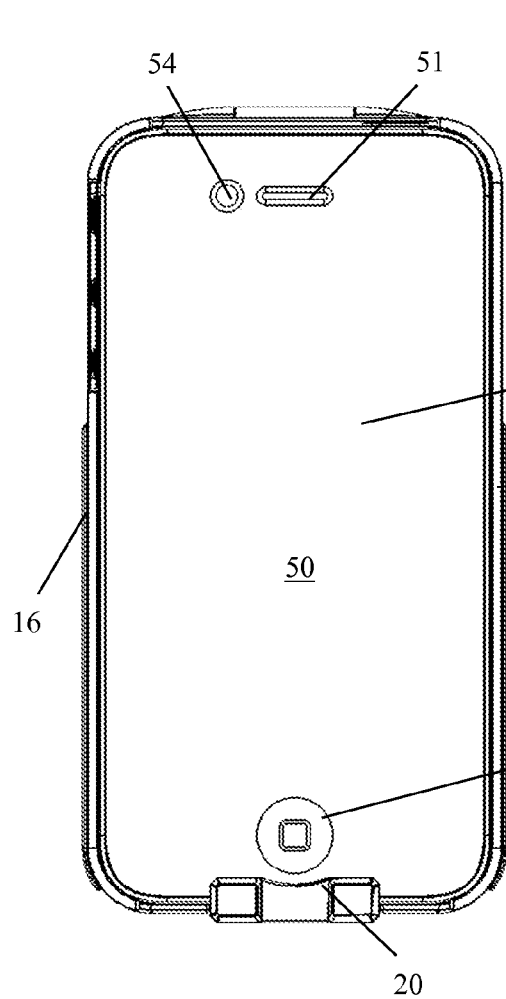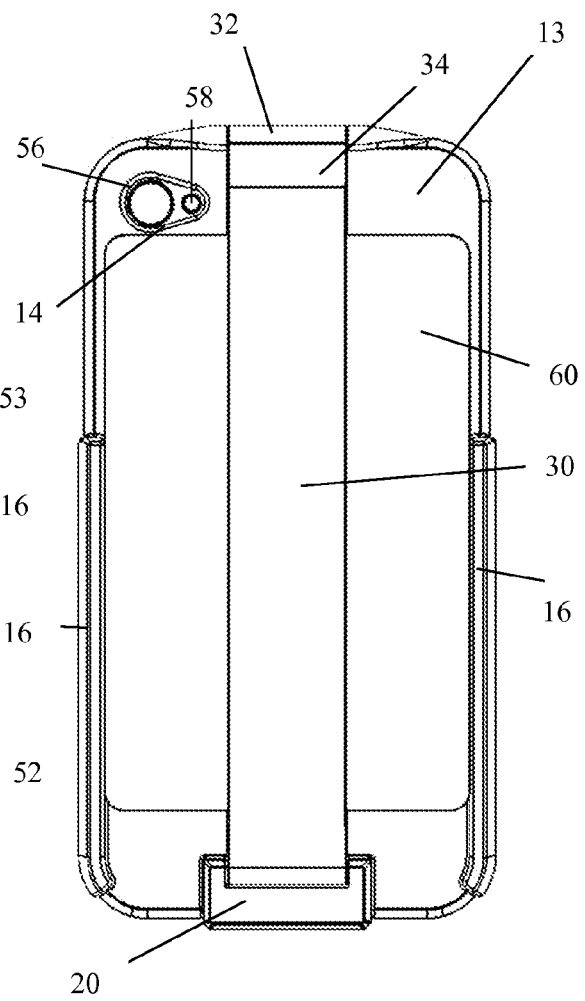
Fig. 3
Fig. 4a

MULTIFUNCTIONAL STRAP SYSTEM FOR HANDHELD PORTABLE ELECTRONIC DEVICES

RELATED APPLICATIONS

This application claims priority from U.S. Provisional Application Ser. No. 61/505,943 by Chiu, et al., entitled "A Multifunctional Strap System for Handheld Portable Electronic Devices" filed on Jul. 8, 2011, the contents of which are incorporated herein in their entirety by reference.

FIELD OF THE INVENTION

The present invention relates generally to portable electronic devices. More specifically, the present invention relates to accessories for portable electronic devices.

BACKGROUND OF THE INVENTION

Cases and other protective accessories for portable electronic devices such as cell phones, digital audio players, digital cameras, electronic book readers and tablets are known in the art. A basic case for a cell phone such as an Apple iPhone generally has a plastic shell that covers the back of the cell phone with an additional portion to cover the sides of the cell phone. Some cases feature an additional lip to cover a portion of the front of the cell phone.

Existing cases and accessories do not provide much in the way of preventing accidental dropping or slipping of the cell phone out of the hand of a user. Thus, there exists a need for an accessory for a portable electronic device that is versatile and capable of securing a portable electronic device to a hand of a user or to be hung securely on an object.

One example of cases and accessories known in the art include United States Patent Application Publication No. 2010/0116387 to Channey et al. directed to a "Protective Secondary Enclosure Apparatus with Modular Face Protective Options for Handheld Devices." Channey discloses a case with a strap on the back of the case. However, the strap used is anchored at only one point not coupling a user's hand to the device.

It is an object of the invention to provide an improved strap system to allow for better handling of a portable electronic device such as a cell phone or a digital audio player. It is another object of the invention to provide a strap fixed at both ends of a case having two separable straps in parallel. It is a further object of the invention to provide a detachable strap to improve stability, for example, when taking a photo. It is yet a further object of the invention to provide a case that accommodates the strap system in a unified manner.

SUMMARY OF THE INVENTION

One aspect of the present invention provides for a strap system for a portable electronic device comprising a case having a top edge, a bottom edge and a plurality of side edges capable of holding the portable electronic device, at least one strap configured to couple to a hand of a user and at least one clip, wherein the at least one clip is detachably coupled to an edge of the portable electronic device. The case has a carve-out sized to receive the at least one strap. The strap is attached to the top edge of the case by way of a strap pin. The at least one clip is connected to the at least one strap by way of another strap pin. The at least one strap may be connected to an edge opposite to the edge coupled with the at least one clip.

The at least one clip has a back side generally parallel to a back side of the portable electronic device, a bottom side generally parallel to a bottom side of the portable electronic device and a front side generally parallel to a front side of the portable electronic device, wherein the bottom side has a port guard for sealing a port on the bottom side of the portable electronic device. The bottom side of the at least one clip is flat and balanced to allow the portable electronic device to stand freely in an upright position.

Another aspect of the present invention provides for a case having a top portion, a middle portion and a bottom portion, wherein the top portion and bottom portion are connected by at least one strap stretched to create tension allowing the hand of the user to be coupled to the portable electronic device without applying additional external force. The middle portion is removable and configured to fit and conceal a card such as a credit card, a driver's license or even cash. The middle portion may be removed and repositioned either above or below the at least one strap. The middle portion is also configured to act as a kickstand in either a portrait or a landscape orientation to allow the portable electronic device to stand freely. The middle portion forms a portrait hinge where it connects to the top portion, and the middle portion forms a landscape hinge along a side edge of the portable electronic device.

Yet another aspect of the present invention provides for a strap system for a portable electronic device comprising at least one strap and at least one clip, wherein the at least one clip is coupled to an edge or a corner of the portable electronic device. A case is not required for this aspect of the present invention in that the at least one strap coupled with the at least one clip create sufficient tension to keep the at least one clip in place on the portable electronic device.

The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3 is a front view of the strap system depicting a front side of the portable electronic device and a front side of the clip;

FIG. 4a is a rear view of the strap system depicting the strap and a back side of the clip;

DETAILED DESCRIPTION OF THE INVENTION

The present invention generally comprises a strap system for a portable electronic device. Examples of portable electronic devices include, but are not limited to, cell phones, digital audio players, electronic book ("eBook") readers, digital cameras, tablet devices and personal digital assistants ("PDAs"). The strap system has a case that provides protection for the portable electronic device wherein the case has a strap attached to it. The strap may be constructed from elastic or another flexible material.

Figure 1:
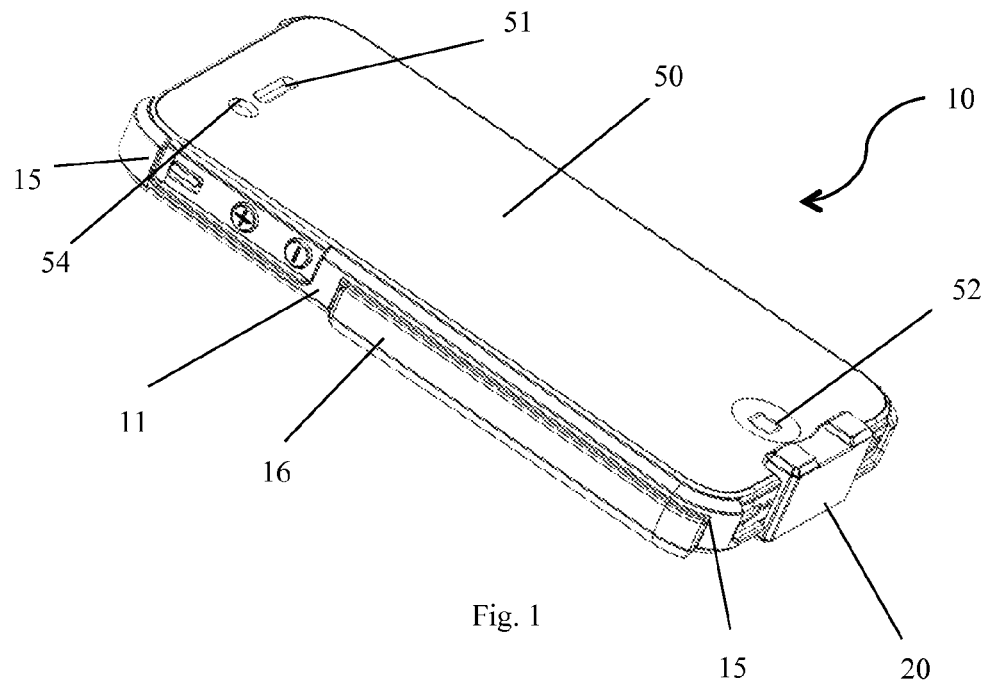
FIG. 1 is a perspective view of a strap system for a portable electronic device comprising a case, a strap and a clip coupled to a portable electronic device.

With regard to FIG. 1, illustrated is a perspective view of a strap system 10 for a portable electronic device 50. In a preferred embodiment, the strap system 10 has a case 11. The case 11 may be constructed from polycarbonate plastic, thermoplastic polyurethane ("TPU"), silicone, metal, aluminum, any other structurally stable material or any combination thereof. A basic design of the case 11 first has a back side of the case 13 having a solid piece of plastic covering substantially all of a back side of the device 50. The case 11 would also have a plurality of case corners 15 which extend from the back side of the device 50 to a front side 53 of the device 50 to cover the corners of the device 50. The portable electronic device 50 may have a speaker 51, a button 52 and a front camera 54, each of which is not obstructed by any part of the strap system 10. The case corners 15 may be contoured to the shape of the device 50.

Figure 2:
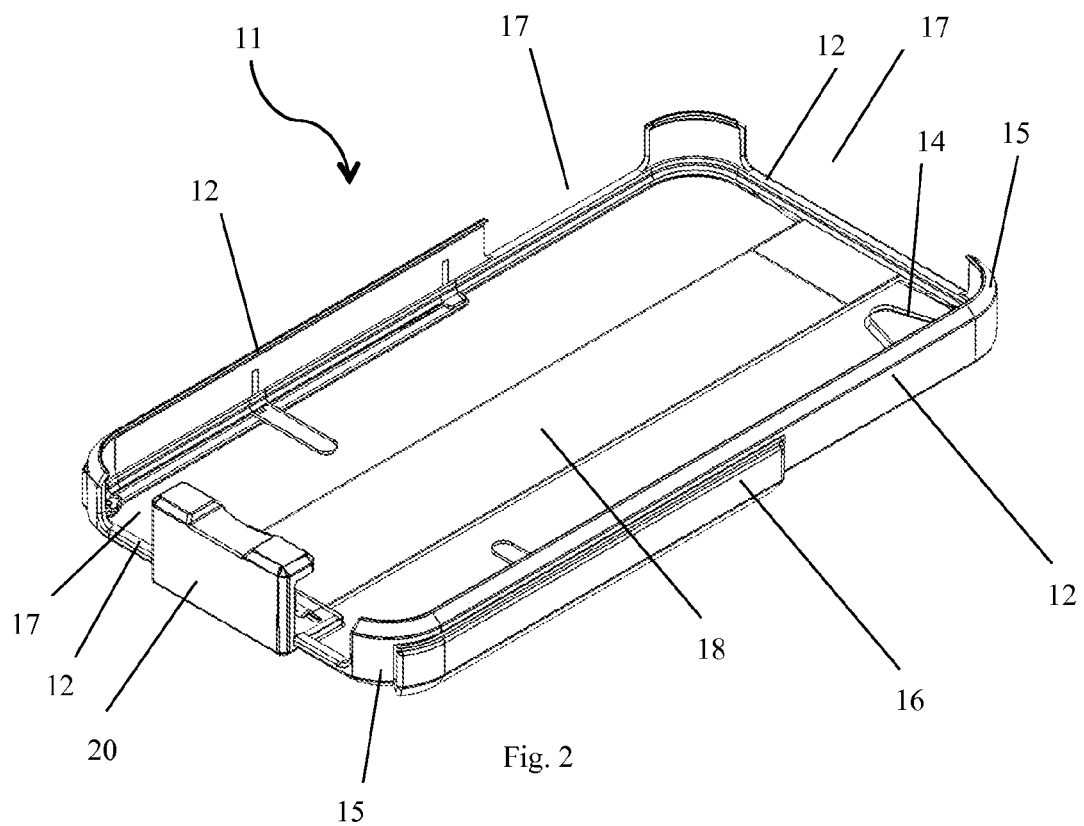
FIG. 2 is a perspective view of the strap system without the portable electronic device.

FIG. 2 is a perspective view of the strap system 10 without the portable electronic device 50 inserted in the case 11. The case 11 may have a wall portion 12 extending along a lateral edge, a top edge or a bottom edge of the device. The wall portions 12 may also have a cutout 17 to accommodate for a button, a switch, an accessory port or any multiples or combinations thereof. The wall portions 12 may also have a shock-resistant grip 16 made from rubber or similarly tactile material to enhance grip and handling of the portable electronic device.

A front view of the strap system 10 is shown in FIG. 3 with the portable electronic device 50 placed within the case 11. The portable electronic device 50 is fully accessible when used with the strap system 10. Along the bottom edge of the case 11 is a clip 20. The clip 20 may have a contoured edge to accommodate the button 52 as to not obstruct normal usage of the portable electronic device 50. The camera 54 and the speaker 51 are not obscured by any part of the case 11.

A corresponding rear view is shown in FIG. 4a depicting the strap system 10 with the portable electronic device 50 placed within the case 11. The rear side 13 of the case 11 has a cutout 14 to allow access to a camera 56 and a flash 58. The strap 30 is placed along a vertical axis of the case 11 and preferably constructed from an elastic material. The strap 30 may be fixedly attached to both a top center of the case 11 by being directly adhered to the case 11. Preferably, the strap 30 would be attached by way of a strap pin 32. The strap pin 32 would be optimally an expandable cylindrical rod. The strap pin 32 and the strap 30 may be covered by a strap guard 34 designed to provide protection to the strap 30 and the strap pin 32. The strap 30 may be attached by a mechanical fastener or by being directly adhered at the top of the case 11. Alternatively, the strap 30 may be molded into the case 11 itself during production.

The strap 30 would have sufficient tension to allow a hand or fingers of a user to remain coupled to the portable electronic device 50 without requiring external force. The strap 30 would allow the device to couple to the hand or fingers because the strap would be constructed from an elastic material. This would also allow the hand or fingers of the user to pass under the strap 30 in a comfortable manner without having to change the user's style of gripping the portable electronic device 50. Additionally, the strap 30 would have sufficient tension to allow a card 60, such as a credit card, driver's license or other similarly sized object, to be held into place along the back side 13 of the case 11. The grip 16 has an inner side wall designed to provide additional guide and security for the card 60.

Strap 30 may be attached to any bar (stroller, bicycle, exercise machines, etc.), tube, belt, belt loop, clip, carabiner, waist pack (fanny pack) or other similar system for safe and secure mounting or transport of the device. The clip 20 of the strap 30 allows the strap system 10 to loop around and be secured onto an object. Strap 30 may be attached to a separate armband to offer portability during workout and other activities which require hands-free operation of the device 50 (e.g. walking or running).

The strap 30 is attached to the clip 20 preferably with another strap pin 32. The clip 20 would attach to a notch at the bottom of the case 11. The clip 20 may be detached from the bottom of the case 11 to allow the user to change their grip of the strap 30 such as when taking a photo or a video with the camera 56 that is a component of the portable electronic device 50. The clip 20 is preferably molded to the contour of the case 11.

In an alternative embodiment, the strap 30 may be configured to connect to an upper left corner of the case 11, an upper right corner of the case 11 and a bottom center of the case 11 wherein the strap 30 is formed from three elastic pieces connected at a midpoint intersection generally located near the center of the case 11. This configuration would have the strap 30 arranged in the shape of a 'Y' character. Alternatively, the 'Y' may be inverted wherein the strap 30 connects at a top center of the case 11, a bottom left corner of the case 11 and a bottom right corner of the case 11. Further alternatively, the strap 30 may be configured to connect to a bottom left corner and a bottom right corner instead of the bottom center. This would allow for the strap 30 to take the general form of an 'X' character.

Figure 4B:
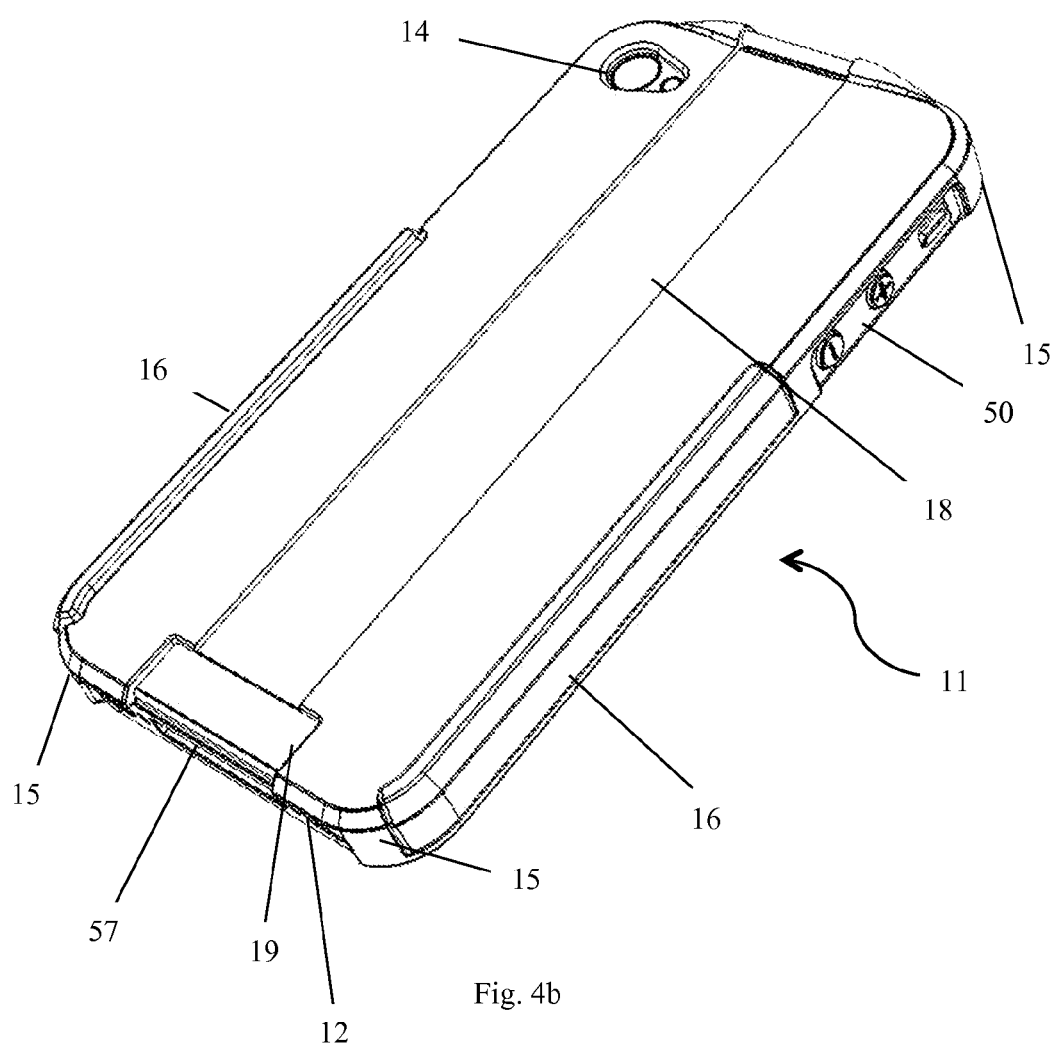
FIG. 4b is a rear perspective view of the strap system without the strap or the clip attached to the case.

For illustrative purposes, FIG. 4b is a rear perspective view of the strap system 10 without having the strap 30 attached to the case 11. Notwithstanding the shape of the strap 30 used in the present invention, the case may also have a strap carve-out 18 along the back side of the case 11. The strap carve-out 18 would be optimally sized to fit the strap 30 within the strap carve-out 18 as to not create additional thickness when the strap 30 is in a neutral position. The case 11 may also have a clip carve-out 19 configured to accommodate the clip 20 when in a neutral position. The case 11 would be molded with the same shape that makes up the strap 30.

The strap carve-out 18 may also be used to secure an external stand to allow for portrait or landscape standing of the portable electronic device 50. The external stand can slide up or down to adjust the angle for portrait viewing. The angle for landscape viewing will be fixed to ensure proper structural stability.

Figure 5:
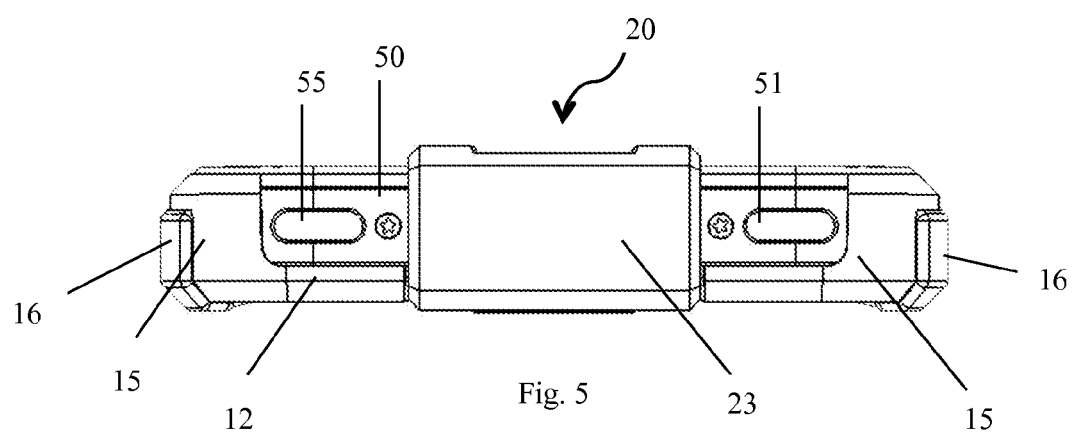
FIG. 5 is a bottom view of the strap system.

With reference to FIG. 5, illustrated is a bottom view of the strap system 10. The wall portion 18 at the bottom edge of the personal electronic device 50 has a cut out 17 to accommodate a speaker 51, a microphone 55 and a port 57 along the bottom side of the personal electronic device 50. The clip 20, which is centered along a longitudinal axis preferably covers the port 57. The clip 20 has a bottom side 23 which is preferably flat to allow the personal electronic device 50 to stand upright solely on the clip 20. When in upright position, the user will have a direct and more convenient view of the display when listening to music, watching video or audio and video conferencing. In addition, clip 20 provides a space or gap between the speaker(s) and the table or surface on which the device is standing. This vertical orientation allows for the sound output to reflect downwards onto the table surface. As a direct result, sound from the device is distributed evenly across the room or environment and the resulting sound quality is richer and clearer.

Figure 6:
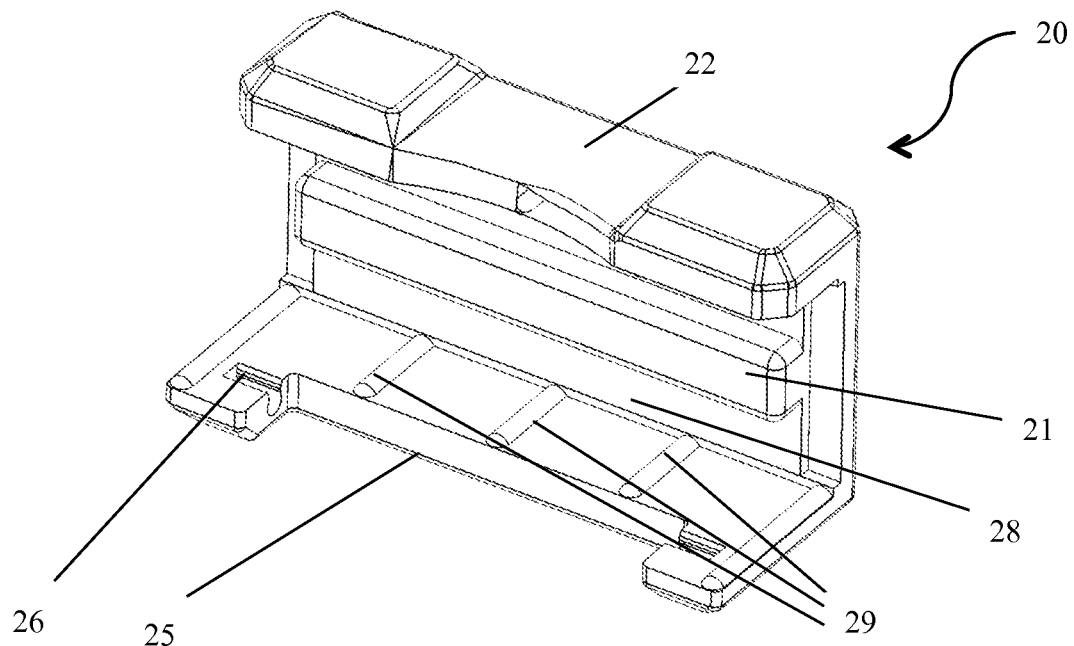
FIG. 6 is a perspective view of the clip.
Figure 7:
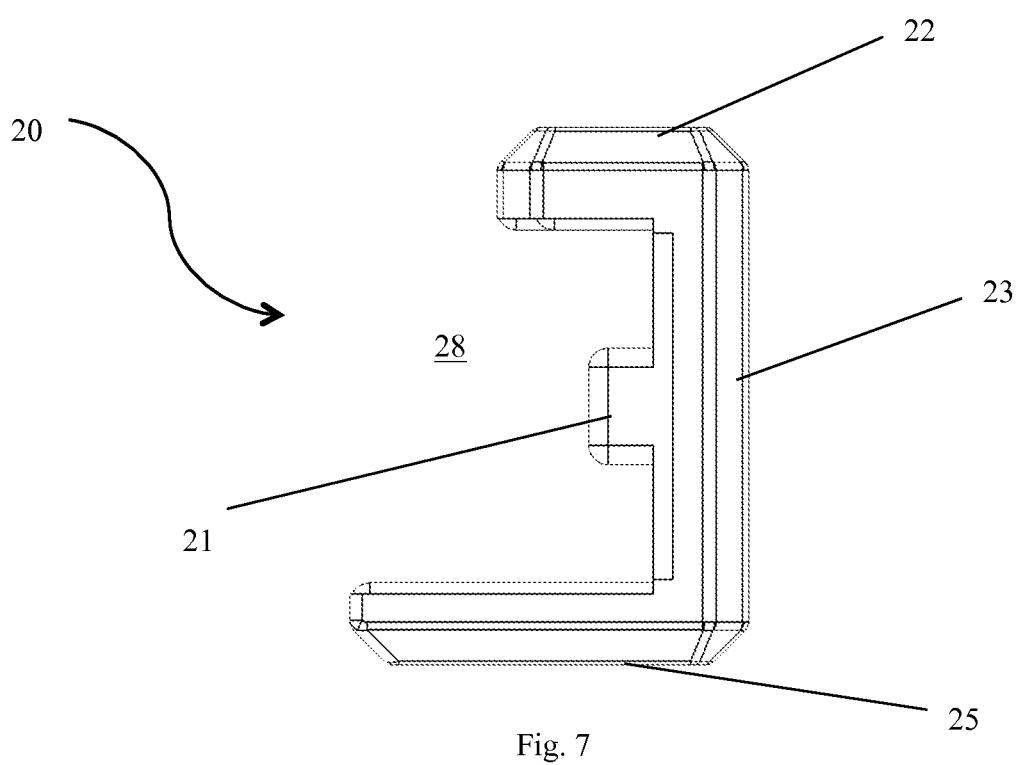
FIG. 7 is a side view of the clip.

The clip 20 is depicted in FIGS. 6 and 7 in a perspective view and a side view, respectively. The clip 20 has a front side or a lip 22, a bottom side 23, a back side 25 and an inner cavity 28. The bottom side 23 a port guard 21 made from rubber or other soft material facing inward toward the inner cavity 28 configured to seal a port on the portable electronic device 50. The back side 25 is configured to receive the strap pin 32 in a pin slot 26. The pin slot 26 allows the strap pin 32 to remain fixed within the clip 20 to permit movement between the strap 30 and the clip 20.

The inner cavity 28 has at least one rubber bead 29 configured to be a cushion to protect the portable electronic device 50 and its surfaces. The inner cavity 28 of the clip 20 is contoured to the shape of the port to protect the port from dust, moisture and debris. This allows the port 57 to be free from dust, debris, water and moisture that may normally accumulate through normal usage of the portable electronic device 50. The clip 20 may also feature a magnet to allow the clip 20 to be securely attached to another metallic object.

Figure 8:
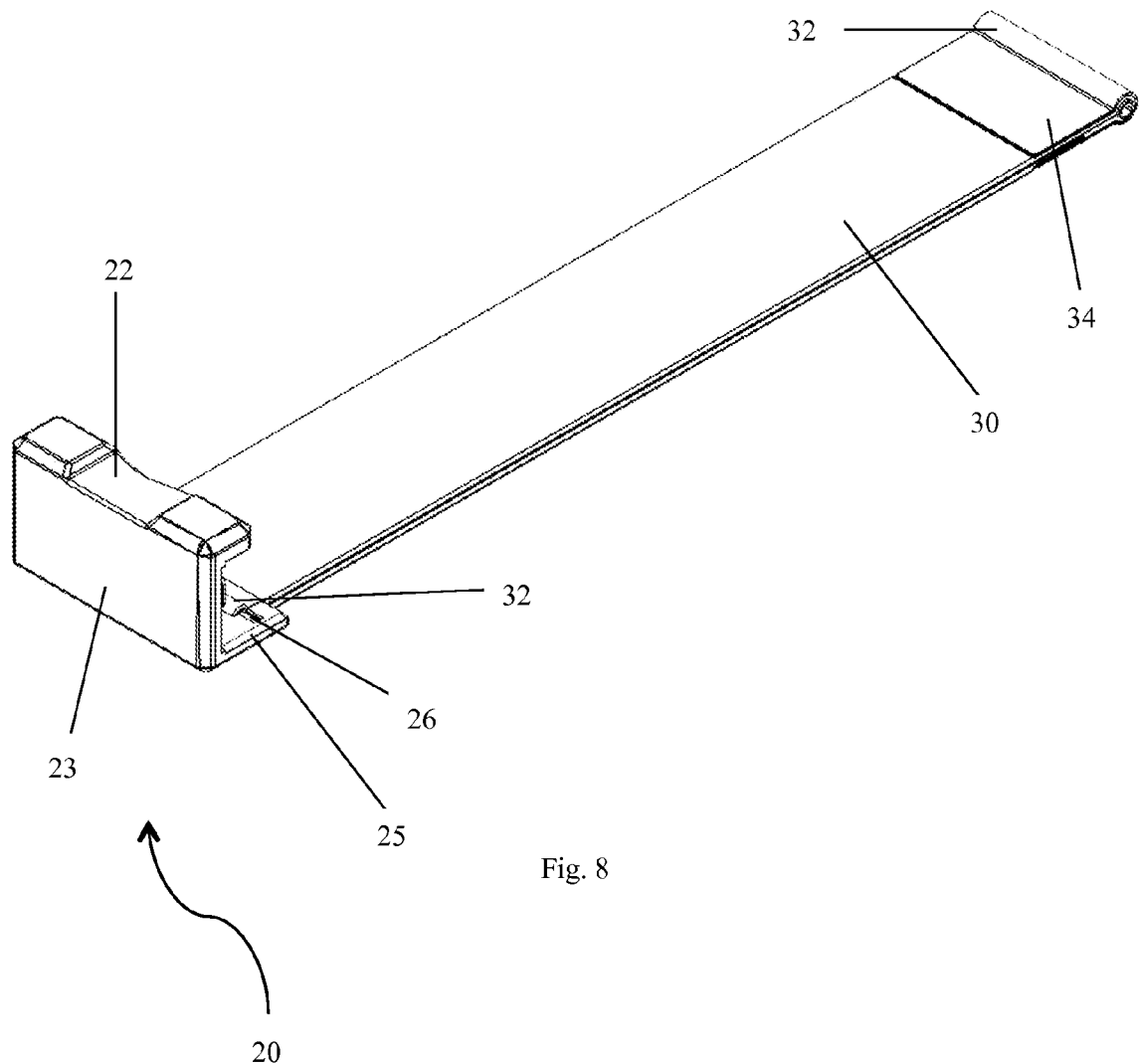
FIG. 8 is a perspective view of a strap coupled to the clip.

Referring to FIG. 8, depicted is a perspective view of the clip 20 attached to the strap 30. The strap pin 32 that connects the strap 30 to the case 11 is opposite of the clip 20. The strap pin 32 is enclosed by a strap guard 34 configured to accentuate and protect the strap 30. The strap guard 34 may enclose any number or type of strap pins 32 featured on the strap 30 without departing from the scope of the invention.

Figure 9:
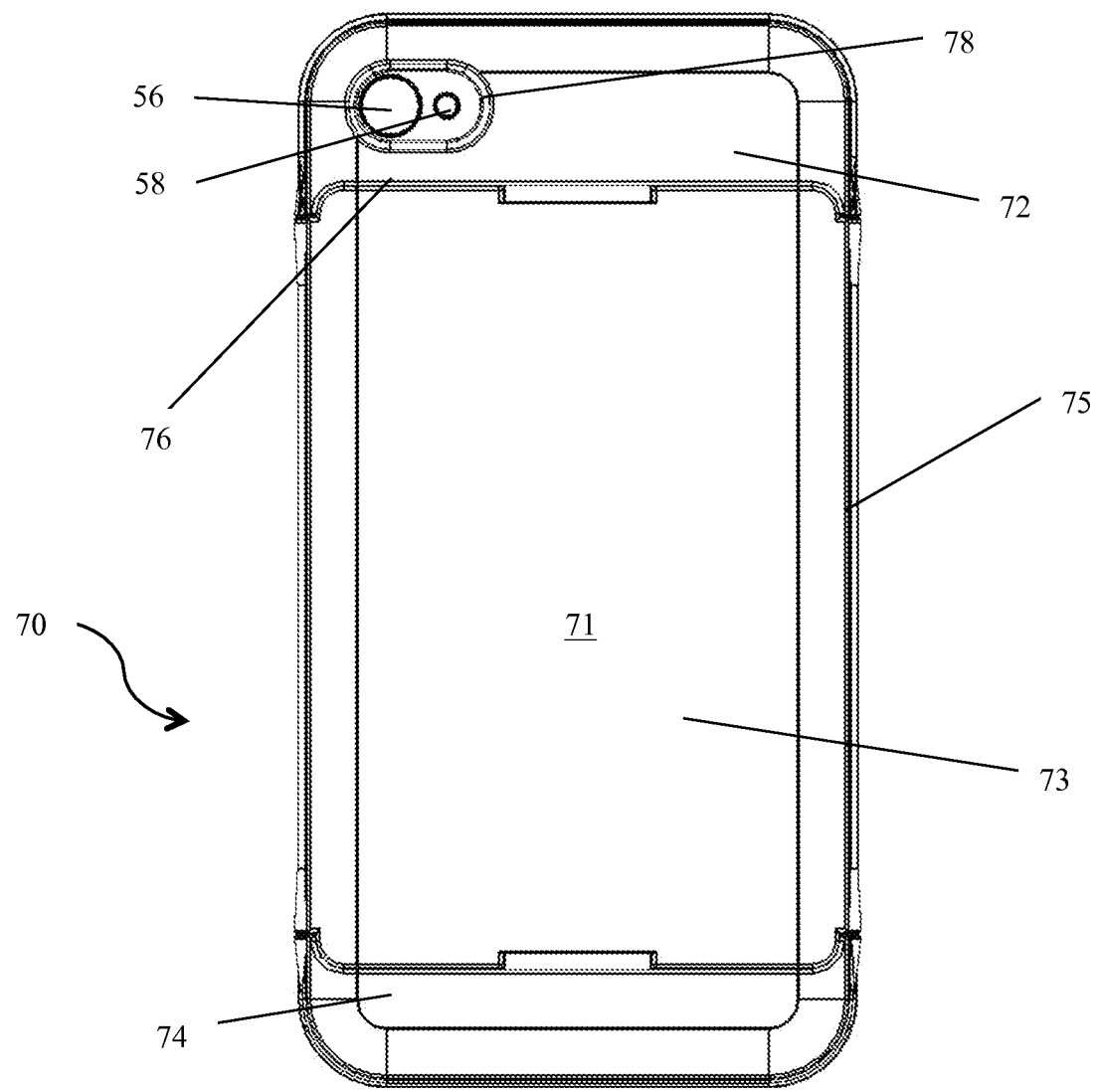
FIG. 9 is a rear view of an alternate embodiment featuring a three-piece split case comprising a top portion, a middle portion and a bottom portion.
Figure 10A:
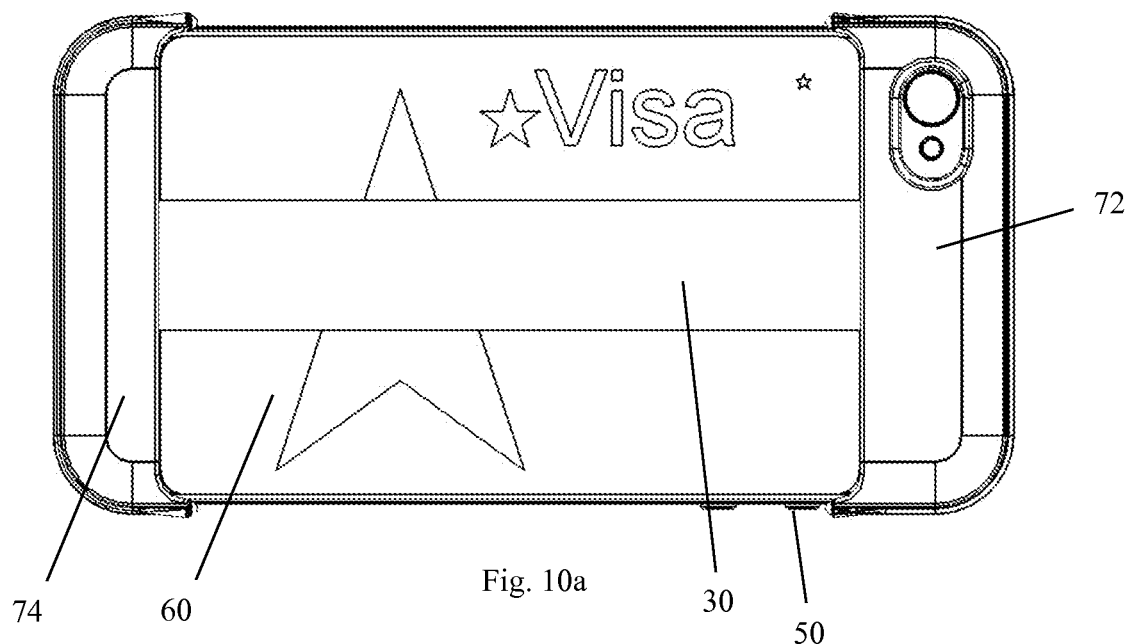
FIG. 10a is a rear view of the case having the middle portion detached exposing a double strap system.
Figure 10B:
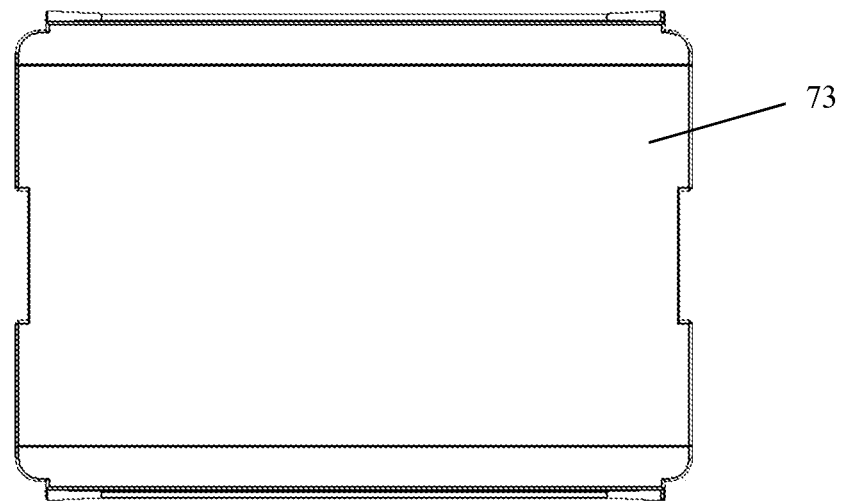
FIG. 10b is a rear view of the middle portion detached from the case.

An alternative embodiment is depicted in FIGS. 9, 10a and 10b in a rear view of a strap system 70 for the portable electronic device 50. This alternate embodiment has a case 71 comprising a top portion 72, a middle portion 73 and a bottom portion 74. The top portion 72 has a cutout 78 to accommodate for a camera 56, a camera flash 58 or a speaker if embedded in the device. The top portion 72 and the middle portion 73 intersect to form a portrait hinge 76. Along a side edge of the portable electronic device 50 between the top portion 72 and the bottom portion 74 is a landscape hinge 75.

The middle portion 73 is detachable from the case 70. Additionally, the middle portion 73 can be used as a screen protector installation guide and squeegee. The middle portion 73 may also have a minor, a mirror finish or any reflective material on an inner surface to provide a reflective surface for personal grooming. An alternative configuration of the strap system 70 allows the strap 30 to be placed above or below the middle portion 73 without disrupting the structural integrity of the case 71.

An alternative embodiment could have the middle portion 73 as being integral to the top portion 72 and thus not detachable as in the preferred embodiment. This would allow the bottom portion 74 to be removable from the portable electronic device 50 while remaining attached to the strap 30.

Figure 11:
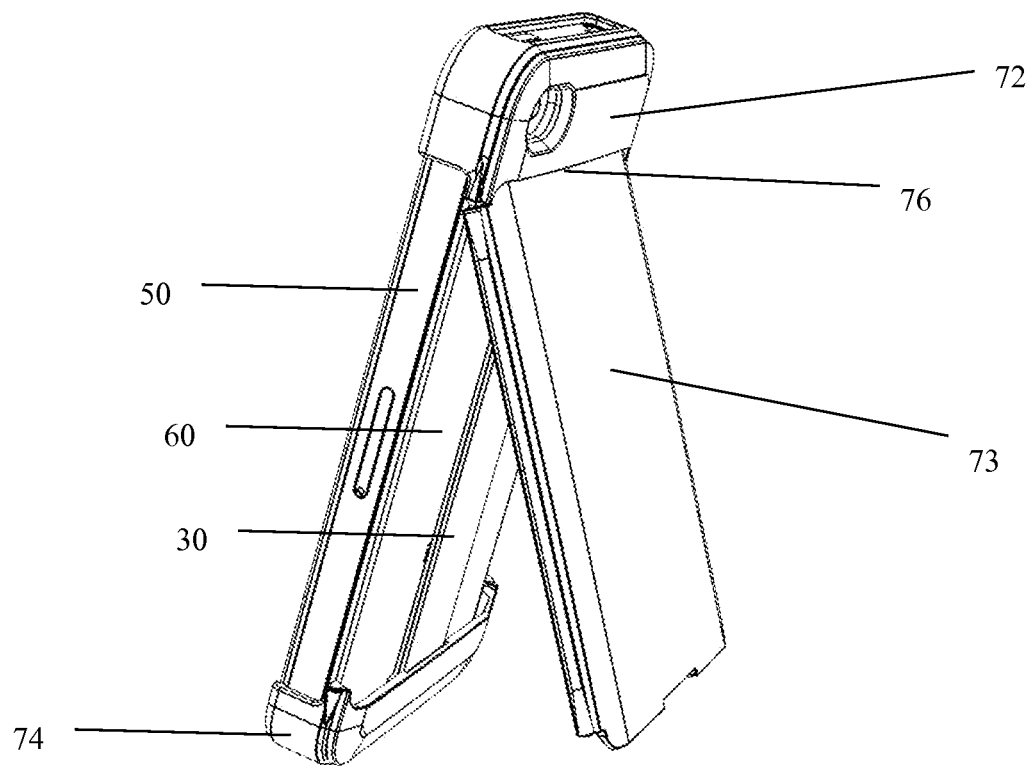
FIG. 11 is a rear perspective view of the middle portion used as a kickstand for portrait viewing of a portable electronic device display.
Figure 12:
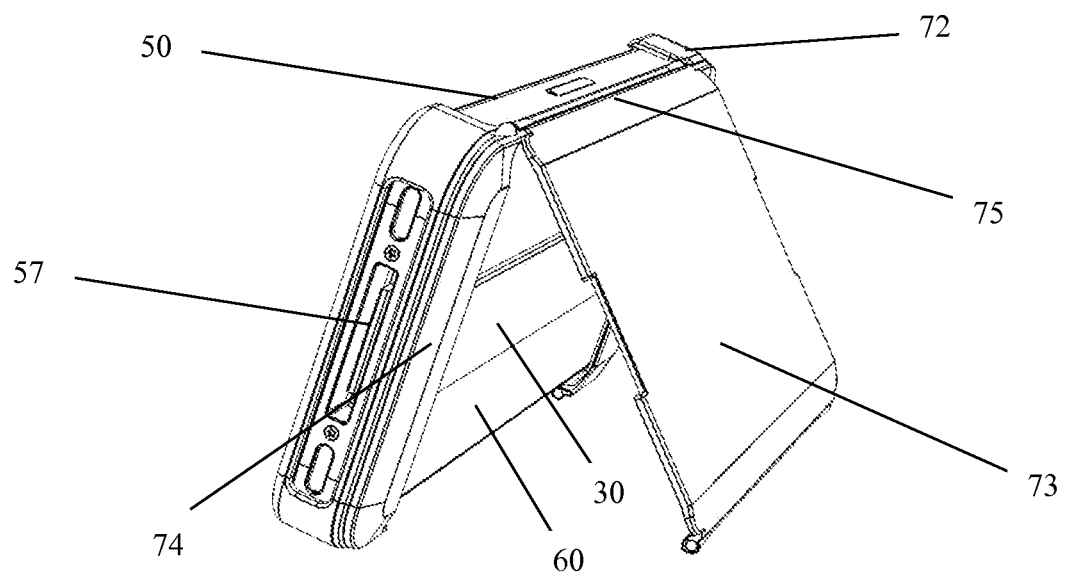
FIG. 12 is a rear perspective view of the middle portion used as a kickstand for landscape viewing of the portable electronic device display.

Furthermore, FIG. 11 depicts the strap system 70 while using the middle portion 73 as a kickstand in a portrait orientation. The middle portion 73 pivots about the portrait hinge 76 to provide structural stability while in the portrait orientation. FIG. 12 depicts the strap system 70 while using the middle portion 73 as a kickstand in a landscape orientation. The middle portion 73 pivots about the landscape hinge 75 to provide structural stability while in the landscape orientation. The card 60 and the strap 30 are visible when the middle portion 73 is used as a kickstand. The case 71 may also have a perimeter constructed with a rubber edge to improve the user's grip and to provide a non-slip surface for standing the portable electronic device 50. The case 71 may also have a plurality of corners made from a rubber or other tactile material to provide a non-slip surface to prevent slippage of the portable electronic device 50 while freely standing.

Yet another embodiment of the present invention does not have a case for the portable electronic device. Rather, the strap 30 is connected to a first and second clip 20 on a top portion and a bottom portion of the strap 30. The first and second clips 20 would attach to a top and bottom of the device. The strap 30 would then be stretched in such a way that the strap 30 would be sufficiently tensed to keep the first and second clips 20 attached to the top and bottom of the portable electronic device 50 without an additional attachment to the clips 20 and the device 50. An alternative to this embodiment affixes the strap 30 to the portable electronic device 50 directly without need for an external accessory such as a case or a clip. In this embodiment, the strap 30 would be integral to the portable electronic device 50 and thus a component thereof.

While the particular Multifunctional Strap System for Handheld Portable Electronic Devices as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A partial enclosure shell for a portable electronic device having a face for user interaction comprising:
   a case comprising a back, a top side, a bottom side, a left side, and a right side collectively defining a cavity of a shape and size adapted to receive and hold the portable electronic device;
   at least one strap configured to couple the case to a user's hand, where one end of the strap is coupled to the case at a point proximate to the case's top side; and
   at least one clip, wherein the at least one clip is coupled to the opposing end of the strap and detachably coupled to the bottom side of the portable electronic device where the clip has a back portion connected to a base with the base, in turn, connected to a front portion and the clip is so shaped that when coupled to the bottom side of the portable electronic device the back portion is generally planar in a plane parallel to the plane of the back side of the shell and is also adjacent to the back side of the shell, and where the front portion is generally planar in a plane parallel to the plane of the face of the portable electronic device and adjacent to the face.

2. The partial enclosure shell for a portable electronic device of claim 1, wherein the case further comprises a channel co-extensive with and disposed under at least one strap with a shape about the shape of the strap to receive at least one strap.

3. The partial enclosure shell for a portable electronic device of claim 1, further comprising a shock-resistant grip along the outside of the left side of the case and the right side of the case thereby improving handling of the portable electronic device.

4. The partial enclosure shell for a portable electronic device of claim 1, wherein, when the electronic device is held in the cavity, and the clip is coupled to the bottom the of the electronic device, the clip further comprises:

where the base is flat and located and angled relative to the center of gravity of the electronic device to facilitate standing the portable electronic device in an upright position, and where the base extends beyond the front of the electronic device and beyond the back of the case to an extent that the base provides a stand such that the portable electronic device stands upright on a flat horizontal surface without other support.

5. The partial enclosure shell for a portable electronic device of claim 4 wherein the at least one strap is stretched to create tension allowing the hand of the user to be coupled to the portable electronic device without applying external force.

6. A strap system for a portable electronic device comprising:

a case comprising a top edge, a bottom edge and a plurality of side edges, wherein the case is configured to hold the portable electronic device in a main cavity;

at least one strap configured to couple to a hand of a user; and at least one clip coupled to the strap wherein the at least one clip is detachably coupled to the bottom edge of the portable electronic device and wherein the at least one clip further comprises:

a back side generally parallel to a back side of the portable electronic device;

a bottom side generally parallel to a bottom side of the portable electronic device, wherein the bottom side is flat and balanced to facilitate standing the portable electronic device in an upright position; and further comprising a port guard on the bottom side of the at least one clip for sealing a port on the bottom side of the portable electronic device.

7. A partial enclosure shell for a portable electronic device comprising:

a case comprising a back, a top side, a bottom side a left side and a right side collectively defining a cavity of a shape and size adapted to hold the portable electronic device;

at least one strap configured to couple the case to a user's and, where one end of the strap is coupled to the case at a point proximate to the case's top side; and at least one clip, wherein the at least one clip having a back portion, a base, and a front portion generally parallel to the back portion is coupled to the opposing end of the strap and detachably coupled to the bottom side of the portable electronic device, and wherein, when the electronic device is held in the cavity, and the at least one clip is coupled to the bottom of the electronic device the base of the clip comprises a port guard for covering a port on the bottom side of the portable electronic device.

* * * * *